Feb. 12, 1957 L. R. ROBINSON 2,780,858
REINFORCED CUTTING TOOL
Filed Sept. 27, 1952

INVENTOR.
LAWRENCE R. ROBINSON
BY
Oldham & Oldham
ATTORNEYS

United States Patent Office 2,780,858
Patented Feb. 12, 1957

2,780,858

REINFORCED CUTTING TOOL

Lawrence R. Robinson, Dormont, Pa.

Application September 27, 1952, Serial No. 311,840

5 Claims. (Cl. 29—105)

This invention relates to cutting tools, and particularly to a new combination by which cutting tools protruding from a hub are reinforced against chipping or cracking.

Heretofore, there have been many types of cutting tools designed and built but in nearly all instances the actual cutter element is an insert carrier by a hub or mandrel and with the cutter insert protruding from the cutter mandrel for cutting action. When very hard cutters, such as tungsten carbide cutters or cutter inserts are used, these very hard cutter inserts frequently chip or crack in use as the cutter inserts are frequently subjected to severe shocks and stresses.

The general object of the present invention is to provide a new type of a cutter tool which is characterized by the soft metal used in securing hard cutter inserts to the cutter hub.

A further object of the invention is to reinforce cutter inserts in a cutter by use of a soft metal that lies substantially flush with the cutting edges of the inserts to reinforce and protect such cutting edges against injury.

Still another object of the invention is to position cutter inserts in a cutter member in a relatively simple manner so as to increase the effective service life of the cutter inserts.

The foregoing and other objects and advantages of the invention will be made more apparent as the specification proceeds.

For a better understanding of the invention, attention is directed to the accompanying drawings wherein two currently preferred embodiments of the invention are shown illustrating the principles of the invention, and wherein.

The present invention comprises the positioning of hard cutter inserts in a cutter mandrel or hub with a portion of the insert protruding beyond the periphery of the cutter hub, and reinforcing such cutter inserts by the use of a soft material, such as silver solder which aids in securing the cutter inserts to the cutter and which reinforces the cutter inserts directly at the cutting edges thereof.

Figure 1:
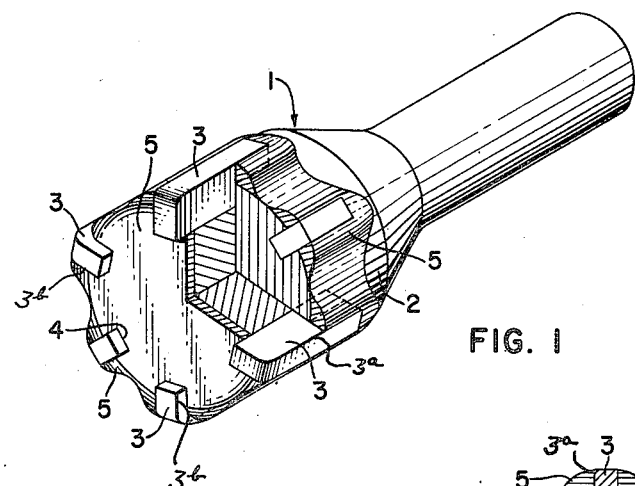
Fig. 1 is a perspective view of a novel cutter of the invention, with portions broken away and shown in section.
Figure 2:
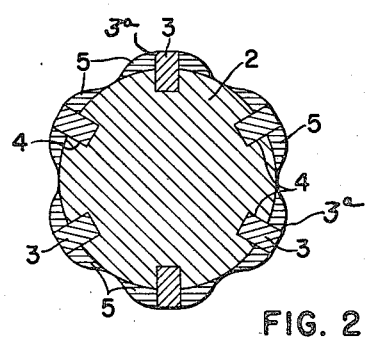
Fig. 2 is a vertical section through the cutter and cutter inserts shown in Fig. 1.

Fig. 1 shows a cutter indicated in general by the numeral 1 and it is adapted for use in any conventional metal cutting operation.

The cutter 1 has a cutter hub 2 in which a plurality of cutter inserts 3 are received in longitudinally directed slots 4 provided in the periphery of the cutter hub 2. The drawings clearly show that the slots 4 are only about one-half the depth, or height of the cutter inserts 3 so that such cutter inserts protrude an appreciable distance from the periphery of the cutter hub 2.

As an important feature of the invention, the cutter inserts 3 are at least partially secured to the cutter body 1 by means of a relatively soft material 5. Usually this material 5 is a silver solder of conventional composition, but other soft soldering or brazing materials usually may be used to position the cutter inserts.

It should be noted that the solder 5 is so built up with relation to the cutter inserts 3 that the solder lies flush against cutting edges 3a of these cutter inserts for substantially their entire length and serves to reinforce such edges directly against any chipping or cracking thereof. The solder 5 will wear away with the cutter inserts so that the solder will be maintained in desired flush relation to the cutting edges 3a as wear occurs. Fig. 1 also shows that some of the cutter edges, such as the edges 3b, are shown with the solder 5 lying in slightly different relation to such cutting edges but still sufficiently closely adjacent them to reinforce against chipping or cracking of the cutter inserts with wear.

Usually the cutter inserts 3 are made from a very hard material, such as tungsten carbide, as these types of cutters give very effective service life except for the chipping or cracking thereof due to the hard, brittle nature of such metals.

Figure 3:
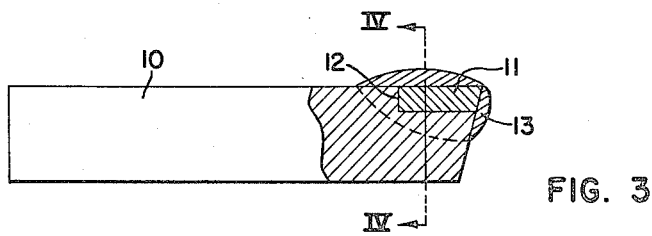
Fig. 3 is an elevational partially broken away and shown in section of a lathe bit constructed in accordance with the invention.
Figure 4:
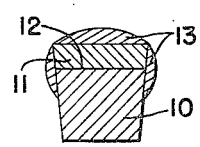
Fig. 4 is a vertical section taken on the line 4—4 of Fig. 3.

Another embodiment of the invention is shown in Figs. 3 and 4 wherein a lathe bit 10 is provided with a tungsten carbide cutter 11 at the cutting end of the lathe bit 10 and with the cutter insert being positioned in a recess 12 formed in the lathe bit. In this instance, the relatively soft material, such as silver solder 13, is deposited over the exposed surfaces of the cutter insert 11, as indicated in the drawings, to secure the cutter insert into position and aid in reinforcing the exposed cutting edges thereof.

It should be noted that the soft material used in association with the cutter inserts of the invention usually will be the only material required to hold the cutter inserts in position. If desired, set screws, or other conventional means can be used to aid in securing the cutter inserts to the rotary cutter hubs or bodies. The soft material used has a relatively low melting point and can be easily removed if it is necessary to remove the cutter inserts for any desired reason.

If excess solder is applied around the cutter inserts in originally positioning them, such excess solder would be quickly removed by use of the cutter, or it could be removed by a preliminary grinding or cutting operation.

In practice, it has been established that the use of the soft reinforcing material in combination with the hard but brittle inserts effectively increases the service life of these cutter inserts and give desirable action when in use so that the objects of the invention have been achieved.

While two complete embodiments of the invention have been disclosed herein, it will be appreciated that modification of these particular embodiments of the invention may be resorted to without departing from the scope of the invention as defined by the appended claims.

Having thus described my invention, what I claim is:

1. A rotary cutter tool comprising a hub having a plurality of longitudinally extending slots in the surface thereof, a cutter insert having exposed cutting edges tightly positioned in each of said slots and protruding from the periphery of said hub, said cutter insert being made from a relatively hard metal, and a relatively soft metal bonded only to the portions of the sides of said cutter insert protruding from said hub and to said hub and lying substantially flush with but exposing the cutting edges of said cutter insert to reinforce the cutting edges of said cutter insert against breakage thereof.

2. A rotary cutter tool comprising a shaft having a slot in the surface thereof, a cutter insert having cutting edges tightly positioned in said slot and protruding from the periphery of said shaft to expose the cutting edges, said cutter insert being made from a hard metal, and a relatively soft metal bonded to the portion of said cutter insert protruding from said shaft and to said shaft and lying substantially flush with but below the cutting edges of said cutter insert to reinforce such cutting edges.

3. A rotary cutter tool comprising a hub having a plurality of slots in the surface thereof, a cutter insert having exposed cutting edges tightly positioned in each of said slots and protruding from the periphery of said hub, said cutter insert being made from a hard metal, and silver solder aiding in securing said cutter insert to said hub and directly reinforcing the cutting edges thereof by engaging exposed surfaces only of said cutter insert and hub.

4. A rotary cutter tool comprising a shaft having a recess in the surface thereof with intersecting walls of the recess being at right angles to each other, a cutter insert having surfaces extending at right angles to each other positioned in said recess and having an exposed cutting edge, said cutter insert being made from a hard metal and having some of its surfaces snugly engaging the right angled surfaces of said recess, and silver solder secured to exposed surfaces of said cutter insert and to said shaft and reinforcing the cutting edges of said cutter insert.

5. A rotary cutter tool comprising a shaft having a recess in the surface thereof, a cutter insert having an exposed cutting edge positioned in said recess and protruding from the periphery of said shaft said cutter insert being made from a hard metal, and a relatively soft metal bonded only to the portion of said cutter insert protruding from said shaft and to said shaft to secure said cutter insert to said shaft, said soft metal substantially covering said cutter insert but exposing the cutting edges thereof and reinforcing the cutting edges of said cutter insert against breakage thereof.

References Cited in the file of this patent

UNITED STATES PATENTS

| | | |
|---|---|---|
| 1,179,753 | Parrock | Apr. 18, 1916 |
| 1,524,218 | Smith et al. | Jan. 27, 1925 |
| 1,886,835 | Purnell | Nov. 8, 1932 |
| 1,939,991 | Krusell | Dec. 19, 1933 |
| 1,948,489 | Balke | Feb. 27, 1934 |
| 2,363,272 | Taeyaerts et al. | Nov. 21, 1944 |